United States Patent [19]

Membrino et al.

[11] 4,286,319
[45] Aug. 25, 1981

[54] EXPANDABLE INTER-COMPUTER COMMUNICATION SYSTEM

[75] Inventors: Robert J. Membrino, Silver Spring; Raphael R. Some, Beltsville; Van A. Quinn, Columbia, all of Md.

[73] Assignee: The Singer Company, Binghamton, N.Y.

[21] Appl. No.: 857,916

[22] Filed: Dec. 6, 1977

[51] Int. Cl.³ .................... G06F 15/16; G06F 15/56; H04B 3/00
[52] U.S. Cl. ................................ 364/200; 364/900
[58] Field of Search ............... 364/102, 900 MS File, 364/200 MS File; 307/290

[56] References Cited

U.S. PATENT DOCUMENTS

| | | | |
|---|---|---|---|
| 3,281,788 | 10/1966 | Hernan et al. | 364/900 |
| 3,564,509 | 2/1971 | Perkins et al. | 364/200 |
| 3,634,830 | 1/1972 | Baskin | 364/200 |
| 3,646,265 | 2/1972 | Eberhardt | 325/323 |
| 3,737,861 | 6/1973 | O'Neill | 364/200 |
| 3,993,981 | 11/1976 | Cassarino, Jr. | 364/200 |
| 4,004,283 | 1/1977 | Bennett | 364/200 |
| 4,047,246 | 9/1977 | Kerllenevich | 364/200 |
| 4,053,950 | 10/1977 | Bourke et al. | 364/200 |
| 4,067,059 | 1/1978 | Derchak | 364/200 |
| 4,120,028 | 10/1978 | Membrino | 364/200 |

*Primary Examiner*—Gareth D. Shaw
*Assistant Examiner*—David Y. Eng
*Attorney, Agent, or Firm*—Ronald Reichman; Stanton D. Weinstein; Jeff Rothenberg

[57] ABSTRACT

This disclosure describes a system for providing a communications channel between a master computer and a plurality of similar or dissimilar slave computers that may be separated by great distances. The foregoing system comprises a buffer unit and at least one computer linkage unit. The buffer unit acts as an interface between the master or control computer, the external hardware that is coupled to the master computer and a plurality of slave computers, and the one or more computer linkage units so that the buffer unit may act as an expandable direct memory access bus to a slave computer and provide communication with a plurality of peripheral systems. The computer linkage unit performs all of the remaining interface functions between the master computer and the plurality of slave computers that are coupled to the master computer. Additional computer linkage units together with additional slave computers may be connected to the original computer linkage unit permitting this system to be easily expandable without extensive modifications.

20 Claims, 3 Drawing Figures

EXPANDABLE INTER-COMPUTER COMMUNICATION SYSTEM

BACKGROUND OF THE INVENTION

1. Field of the Invention

This invention relates to electronic circuits and, more particularly, to communication channels that provide the means whereby a plurality of computers may communicate.

2. Description of the Prior Art

Before the discovery of speech, man used signs and gestures to communicate with other people. As civilization advanced, man's ability to communicate increased. He used drum beats, smoke signals, signal flags, light signals, etc., to convey his thoughts to other people. Thereafter, electrical communication systems were developed like the teletype wherein one electronic communication system under the control of an operator communicated with other electrical systems.

Man has also developed machines such as computers which can perform a sequence of calculations without human intervention.

Functionally described, the present electronic digital computer comprises four components: an arithmetic or computing unit, a high-speed internal storage unit, a control unit, and input-output devices to enable the outside world to communicate with the computer. The data and instructions that are contained within the computer are indistinguishable from each other. Both are represented by electronic circuitry or binary coded patterns that are affixed to some material.

In order to exploit the high operating speeds of digital computers, the digital computer contains built-in branching operations that enable the control unit of the computer to select alternate paths through the computer circuitry for the solution of the particular problem that is currently being processed.

In order to improve the calculating capability and the efficiency of the computer, the computer may be connected to one or more additional computers, enabling each computer to simultaneously solve different parts of the same problems. Thus, each individual computer communicated with the master computer that was controlling and organizing the operation of the plurality of computers that were being connected together. An interface unit was required to be connected between each individual computer to make the computers electrically compatible and to have them operate with each other in a synchronous or asynchronous manner.

The electrical signals that were outputted by any one of the computers were electrically weak and were not able to travel great distances. Thus, the computers had to be connected in relatively close proximity, thereby being in the same electrical cabinets or in the same room. If the computers were connected by a complicated technology that utilized telephone lines or the like, the resulting communications were very slow.

Most of the systems that were designed by the prior art to interconnect a plurality of computers utilized electrical cables that were short in length and were customized to interconnect the particular computers. Therefore, the computer interconnection systems were designed for the particular communication of two or more computers that were being interconnected. If additional computers or peripheral equipment were required to be added to the system, extensive hardware modifications of the existing computer hardware system were required.

Thus, it was very difficult and costly to develop a high-speed communications channel between a plurality of computers, particularly if the computers were produced by different manufacturers. This is so because of the problems due to line noise, differences in logic levels, signal attenuation, spacial relationships of the computers and the extensive modification that would be required for the system that was going to enable a plurality of computers to communicate with each other.

SUMMARY OF THE INVENTION

This invention overcomes the disadvantages of the prior art by being able to be interconnected between existing computers produced by the same or different manufacturers without requiring extensive modification of the computer system. Mutually electrically compatible computers or non-compatible computers are capable of being connected to an expandable bus, without encountering line noise or attenuation problems, by electrically buffering the signals for transmission between the computers.

The apparatus of this invention is comprised of two different units—the buffer unit and the computer linkage unit. The buffer unit provides for the computer cable line terminations and electrical buffering for the computer input/output bus. Any functions or operations that are normally provided for by the individual computer will pass directly through the buffer unit without the computer's signals undergoing any functional change. The buffer unit is also responsible for transmitting the computer input/output signals to the computer linkage unit by placing the foregoing signals on a common bus. If the heretofore mentioned signals are required to be transmitted to the master computer peripheral I/O, they will be transmitted via twisted pair cables to the particular location that they are going to be sent to.

The computer linkage unit is responsible for performing all of the interface functions that are required between the master computer and the plurality of slave or other computers that are connected to the master computer. The master computer is responsible for determining when communications should or should not occur between the plurality of slave computers and the master computer. The master computer provides for all command functions between the computers for determining what information will be transmitted to a particular slave computer and decoding and interpreting all information that it receives from the slave computers.

The handshake logic will be contained within a computer linkage unit. It will include the control logic and will be used for the decoding, controlling, reading, writing, and interrupting the slave computer's operations when requested to do so by the master computer. Additional slave computers may be connected to the control logic so that they may be added to and come under the control of the master computer to produce an expandable system that does not require hardware modification.

It is an object of this invention to provide a new and improved system that enables a plurality of computers to communicate with each other.

It is another object of this invention to provide a new and improved system for connecting a plurality of slave computers and permitting them to communicate with one master computer.

It is a further object of this invention to provide a new and improved system for interconnecting and intercommunicating a master computer and a plurality of slave computers without modification of the existing hardware.

Other objects and advantages of this invention will become more apparent as the following description proceeds, which description should be considered together with the accompanying drawings.

DESCRIPTION OF A PREFERRED EMBODIMENT

Figure 1:
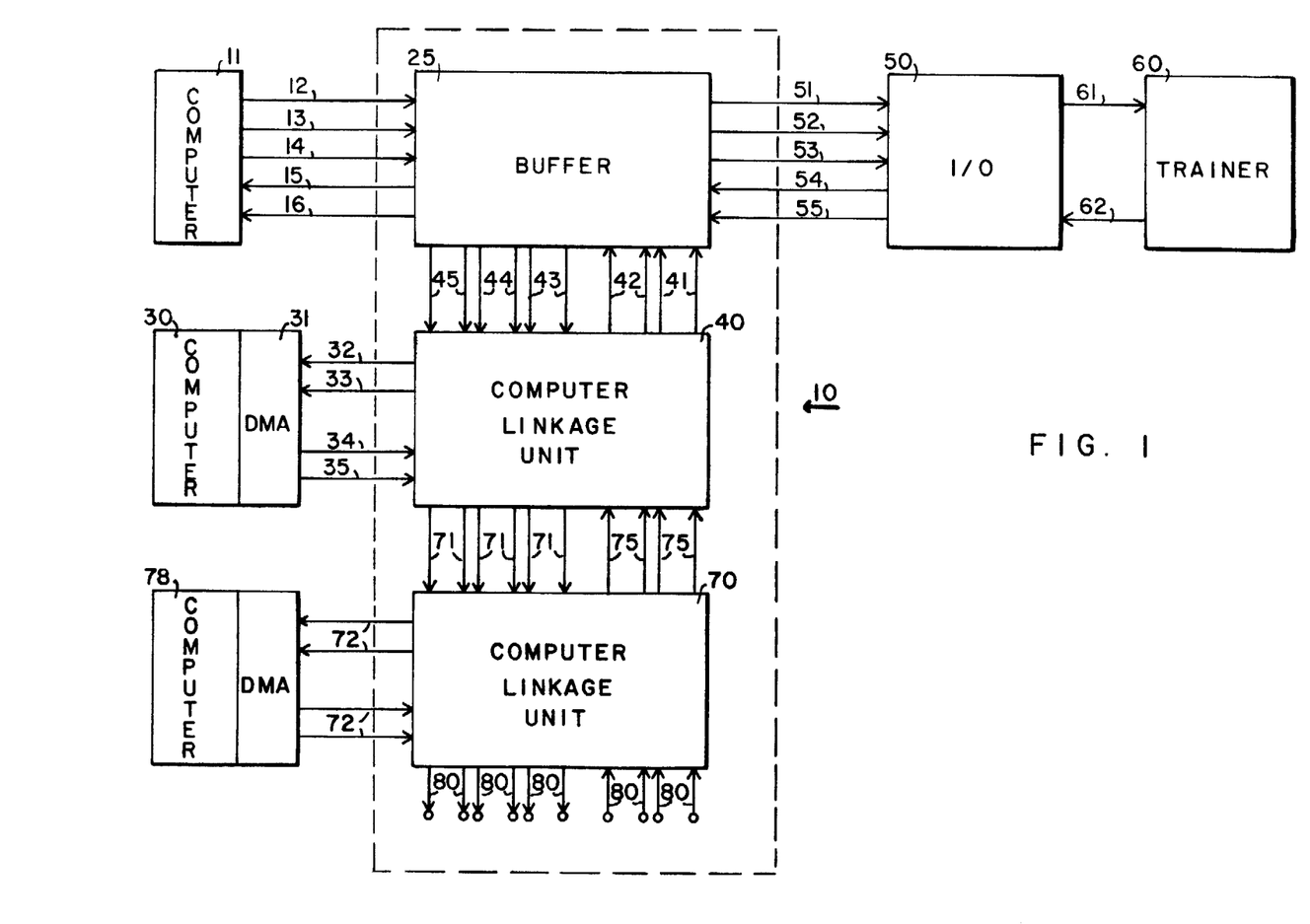
FIG. 1 is a logic diagram of the electrical system that comprises this invention.

Referring now to the drawings in detail and, more particularly, to FIG. 1, the reference character 10 represents the apparatus of this invention and character 11 represents a master computer that is coupled to buffer 25 by means of lines 12, 13, 14, 15 and 16. A slave computer 30 that contains direct memory access channel 31 is coupled to computer linkage unit 40 by means of lines 32-35. Lines 32 and 33 transmit data and control information to DMA channel 31 and lines 34 and 35 transmit data and control information from DMA channel 31 to computer linkage unit 40. Buffer 25 and computer linkage unit 40 are interconnected by pairs of lines 41-45. If one desired that this system would not only include a plurality of computers working together to solve particular problems, buffer 25 may be coupled to a standard input/output device 50 by means of lines 51-55. The standard input/output device may be connected by lines 61 and 62 to any existing system that requires computer control, such as a training simulator 60. A simulator is a device that artificially duplicates conditions that occur in the real world in a controlled environment so that a student may receive practice in the equipment being simulated. Any number of additional slave computers containing direct memory access channels may be connected to master computer 11. The foregoing is accomplished by connecting computer linkage unit 70 to computer linkage unit 40 by means of lines 71 and 75. Lines 71 transmit control address and data information from computer linkage unit 40 to computer linkage unit 70, and lines 75 transmit control and data information from computer linkage unit 70 to computer linkage unit 40. Lines 72 connect the direct memory access channel of computer 78 to computer linkage unit 70. Thus, computer 78 is coupled to computer linkage unit 40. Additional computer linkage units and computers may be connected to terminals 80 in the manner heretofore described.

Buffer 25 is responsible for eliminating line noise, modifying the electrical signals of non-shielded cables that are connected between the master computer 11 and the computer linkage unit 40. Buffer 25 is used for electrically buffering and reforming for transmission over long distances and compensating for the differences in signal strength of the address signals that are transmitted to buffer 25 on lines 12; of the data signals that are transmitted to the buffer 25 on lines 13; of the control signals that are transmitted to the buffer 25 via line 14; of the data signals that are transmitted to computer 11 via line 15, and of the control signals that are transmitted from buffer 25 to computer 11 on line 16. Buffer 25 is also used to modify the data signals (line 44), the address signals (line 45) and the control signals (line 43) that are transmitted between buffer 25 and computer linkage unit 40. The control and data signals that are respectively transmitted from computer linkage unit 40 to buffer 25 via lines 42 and 41 are also modified by buffer 25.

The address signals are used to select what particular slave computer should be used. The control signal instructions are loaded into the computer linkage unit in order to control the sequential operation of the computers, e.g., reading, writing, etc. The data is the result of computer operations that are directed by the computer instructions called the computer program.

Figure 2:
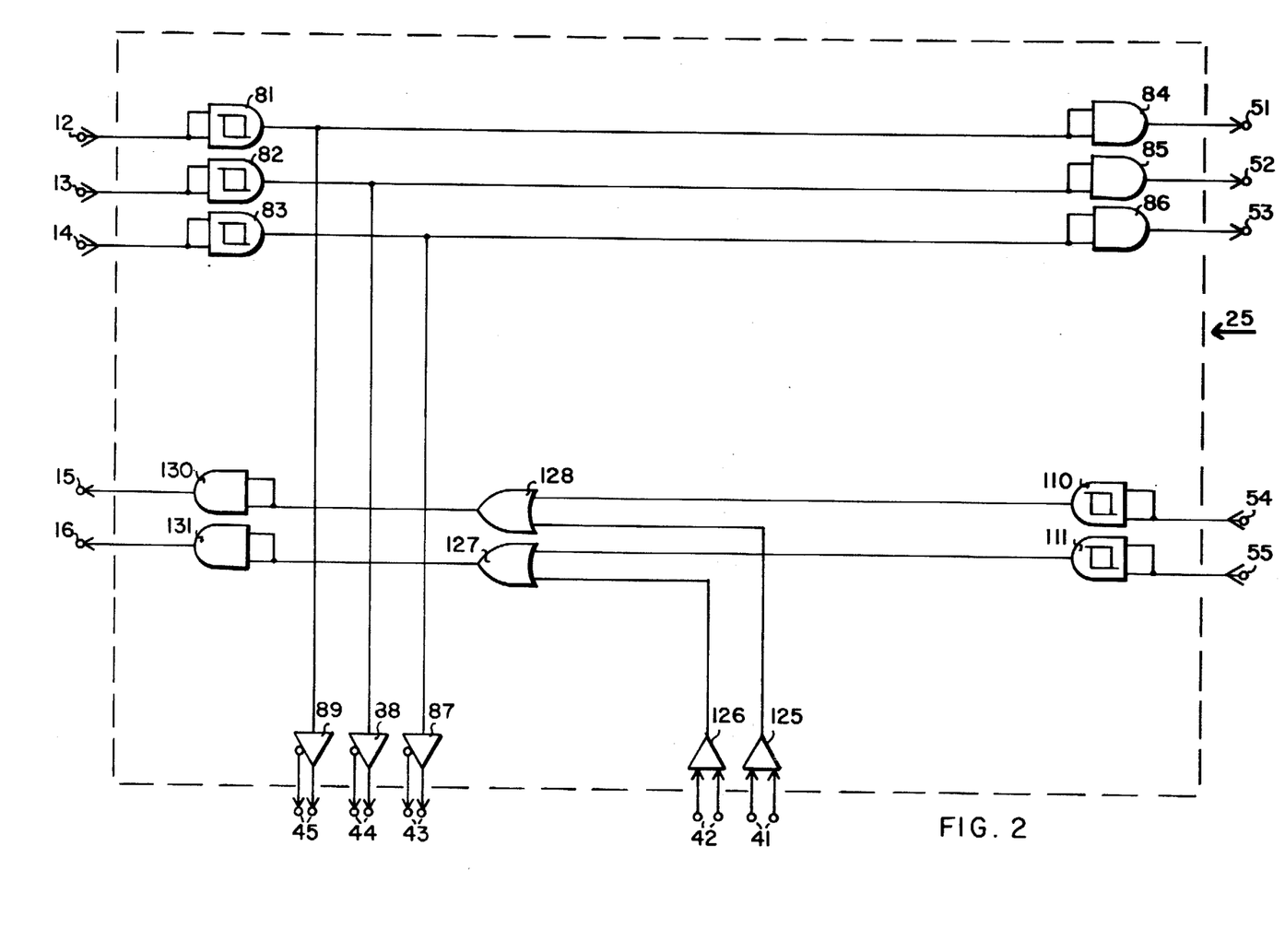
FIG. 2 is a logic diagram of the buffer unit that comprises a portion of this invention.

In FIG. 2, the buffer 25 that was originally shown in FIG. 1 is being depicted in greater detail. The input of master receiver module 81 is connected to that line 12 that carries the address information that was generated by master computer 11. The master computer 11 determines which slave computer and computer linkage unit that is going to be used. The data being transmitted from computer 11 to receiving module 82 is transmitted via line 13. The foregoing data may contain information pertaining to the memory location which is to be stored. Receiver module 83 receives the control information via line 14 or the instructions that determine the manner in which this system functions. The master receiver modules 81, 82 and 83 are Schmidt triggered AND gates that detect and shape the outputs of computer 11 to remove environmental noise from the signals and create high fidelity single ended signals. (A Schmidt triggered AND gate has an accurately shaped constant-amplitude rectangular-pulse output for any input pulse that is above the gates triggering level.) The output of receiver 81 is connected to the two inputs of AND gate 84, and the output of receiver 82 is connected to the two inputs of AND gate 85. The output of receiver 83 is connected to the two inputs of AND gate 86. AND gates 84, 85 and 86 act as driver modules and pass along the electrical signals that they receive to the I/O system 50 without changing any of the signals' electrical characteristics. Thus, the use of gates 84-86 enables additional computer or I/O systems with training systems attached thereto to be added to this system without requiring the system to undergo extensive modification. The output of gates 84-86 are transmitted via lines 51-53 to the input of input/output device 50 (FIG. 1).

Figure 3:
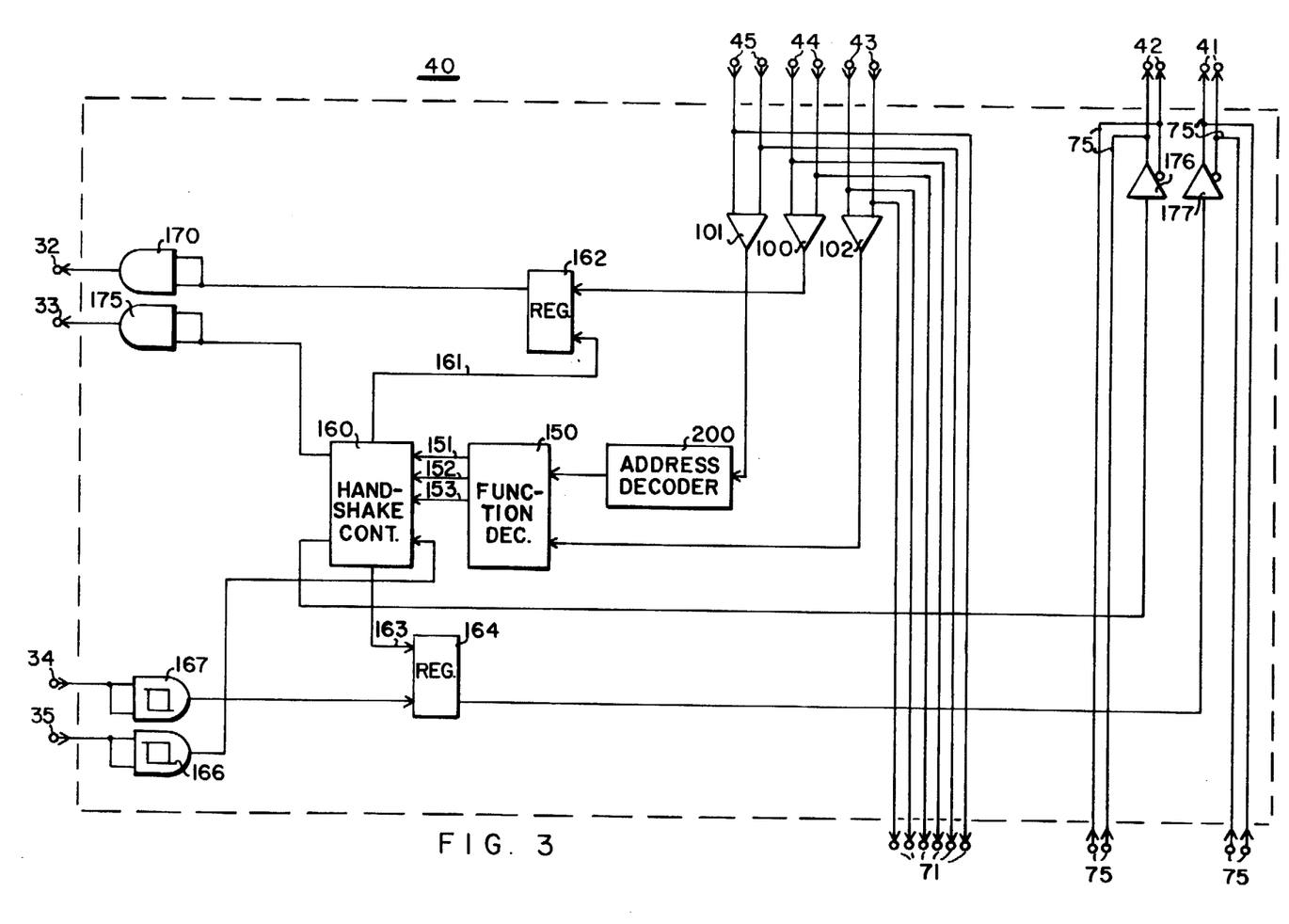
FIG. 3 is a logic diagram of the computer linkage unit that comprises a portion of this invention.

The inputs of differential drivers 87, 88 and 89 are respectively connected to the outputs of master receivers 81-83. Differential drivers 87-89 mate the electrical signals that are transmitted via their output lines 43, 44 and 45 with the differential receivers 100, 101 and 102 which are hereinafter described (FIG. 3).

A differential driver is a device that has one input line and two output lines. The single ended signal that is received on the input of the differential driver is duplicated on one of its output lines and the polarity of the input signal is reversed on the other output line. The two output lines of the differential driver are called differential transmission lines. A differential receiver is a device that is used for sensing differential signals that may be transmitted great distances on differential transmission lines. The inputs to the differential receivers are the differential transmission lines. The receiver compares the two signals according to a critical amplitude in order to clean the signals of the noise that was generated on the lines. If the difference between the critical amplitude and the signal having the positive polarity is positive, positive signal is outputted by the receivers. However, if the critical difference is negative, negative signal is outputted by the receiver.

Differential drivers 87, 88 and 89 allow for the long distance cabling that may be required between buffer unit 25 and computer linkage unit 40 (FIG. 1) by providing noise immunity and high drive (source/sink) capability for the signals that pass through drivers 87–89.

Signals from input/output device 50 (FIG. 1) are transmitted via lines 54 and 55 to the inputs of Schmidt AND gates 110 and 111. Data is being transmitted on line 54 and control information is being transmitted via line 55.

Differential receiver 125 has two input lines 41 that transmit data from the slave computer via the computer linkage unit that is described in FIG. 3. The two inputs to differential receiver 126 are the control lines 42 that supply control information from the slave computer after passing through the computer linkage unit described in FIG. 3.

OR gate 127 has two inputs, the output of differential receiver 126 and the output of Schmidt AND gate 111. The two inputs to OR gate 128 are the outputs of Schmidt AND gate 110 and the output of differential receiver 125. The output of OR gate 128 is data that is being transmitted to the two inputs of AND gate 130. AND gate 131 has two inputs that receive the control signals outputted by OR gate 127. When AND gate 130 is enabled, the data that was produced by other parts of this system and transmitted through buffer 25 is thence transmitted via line 15 to master computer 11 (FIG. 1). Master computer 11 receives control signals via line 16 (FIG. 2) when AND gate 131 is enabled.

Thus, buffer 25 is used in this system as an interface between the master computer 11 and the computer linkage unit 40. Buffer 25 also provides an expandable bus to which additional computer linkage units and slave computers may be connected to enable this system to be expanded. It also provides an expandable bus for the connection of I/O systems and training systems.

The details of the construction of the computer linkage unit 40 or any other computer linkage unit that may be added to this system is shown in FIG. 3. The computer linkage unit is also used to compensate for differences in signal flow. Differential receiver 101 has two inputs. They are lines 45. Lines 45 transmit the address information that was generated by computer 11 via line 12 (FIG. 1), Schmidt AND gate 81 and differential driver 89 (FIG. 2). The aforementioned address information that was generated by computer 11 and passed through buffer unit 25 (FIG. 1) is used to indicate in what particular slave computer the data generated by computer 11 will be stored. The inputs to differential receiver 102 are control lines 43. Control lines 43 transmit the information generated by computer 11 to control the sequence of this system. The control information arrives at receiver 102 via computer 11, line 14 (FIG. 1), Schmidt AND gate 83, differential driver 87, via line 43 (FIG. 2). The data generated by computer 11 is transmitted via line 13 (FIG. 1), Schmidt AND gate 82, differential driver 88 and lines 44 (FIG. 2) to the input of differential receiver 100 (FIG. 3). Differential receivers 100, 101 and 102 are used for receiving information from the buffer unit 25 and route said information to the slave computer controlled by that particular computer linkage unit. If computer 11 decided to send information to a slave computer other than computer 30, the data, address and control signals would be sent to the next computer linkage unit via lines 71. The data, address and control information that is transmitted via lines 71 are connected to lines 44, 45 and 43 which respectively transmit data, address and control information to the designated computer linkage unit.

If master computer 11 decided to send or receive information from slave computer 30 via direct memory access unit 31, the proper address must be sent to address decoder 200 in order to enable the address decoder. Computer 11 (FIG. 1) generates an address that is transmitted via line 12 to Schmidt AND gate 81 (FIG. 2), gate 81 is enabled and its signal is shaped by driver 89 and transmitted via lines 45 to the inputs of differential receiver 101 (FIG. 3). The output of receiver 101 is connected to the input of decoder 200. Each computer linkage unit that may be added to this system contains a different address decoder that is enabled by a different access code. Since address decoder 200 received the proper address code, it was enabled and caused the enabling of function decoder 150. Once function decoder 150 is enabled, it will thereupon decode the remaining portion of the address code and determine which of the following functions computer linkage unit 40 will perform; read, write or interrupt. Slave computer 30 receives control signals (read, write or interrupt) from computer linkage unit 40. If the write function is selected by master computer 11, master computer 11 (FIG. 1) will generate a control signal that will be transmitted via line 14, Schmidt AND gate 83 (FIG. 2), differential driver 87, lines 43, differential receiver 102 (FIG. 3) and function decoder 150. The above-mentioned signal will cause function decoder 150 to generate a write signal that will be transmitted to handshake control 160 via line 153. Handshake control 160 will transmit a signal to the two inputs of AND gate 175. AND gate 175 will be enabled and its output will be an interrupt/write signal which will be transmitted via line 33 to DMA channel 31 (FIG. 1) to inform computer 30 to stop processing information and set up a direct memory access input channel. As previously mentioned, the previously decoded control signal requested this system to write some information into DMA channel 31. Therefore, a positive pulse designating a write instruction will be transmitted via line 153 to handshake control 160.

Handshake control 160 provides for the functional compatibility between the master computer 11 and the remainder of this system. Handshake control 160 will transmit via line 161 a clock pulse that will enable holding register 162, causing holding register 162 to transfer the data word that was written into it by master computer 11 (FIG. 1) and transmitted via line 13, Schmidt AND gate 82 (FIG. 2), differential driver 88, line 44, and differential receiver 100 (FIG. 3) to and gate 170. The enabling of register 162 will place the data contained in register 162 on the inputs of AND gate 170. AND gate 170 will be enabled and its output will be transmitted via line 32 to DMA channel 31 (FIG. 1) so that data from master computer 11 will be transferred to slave computer 30. Upon the completion of the transfer of the data word from register 162 to slave computer 30, direct memory access channel 31 will transmit a control signal via line 35 (FIG. 1). Schmidt AND gate 166 (FIG. 3) will be enabled by the control signal transmitted on line 35. The output of gate 166 will be transmitted to handshake control 160 where the control signal will pass directly therethrough and be transmitted to tristate differential driver 176. The foregoing signal is also used to reset register 162 and handshake control 160 so that computer linkage unit 30 is ready to receive the next word. The output of driver 176 will be transmitted via lines 42 to the input of differential receiver 126. The output of receiver 126 will enable OR gate 127 and the output of gate 127 is connected to the two inputs of AND gate 131. Since only one of the two inputs to OR gate 127 will be active at any given time, the data transmitted to AND gate 131 will be the same data that is being transmitted by differential receiver 126. Gate 131 is enabled, causing a signal to be transmitted via line 16 to computer 11 (FIG. 1), to inform computer 11 that the data word that was previously sent to direct memory access unit 31 has been entered into computer 30 and that the next word to be transmitted to slave computer 30 may be sent by the master computer 11.

Assuming that the address code heretofore decoded by function decoder 150 was a read function, a positive pulse would be transmitted to handshake control 160 via line 151. Meanwhile, master computer 11 (FIG. 1) will generate a control signal that will be transmitted via line 14, Schmidt AND gate 83 (FIG. 2), differential driver 87, lines 43, differential receiver 102 (FIG. 3), and function decoder 150. Thereupon, function decoder 150 will generate a read signal that will be transmitted to handshake control 160 via line 153. Handshake control 160 will transmit a signal to the inputs of AND gate 175. Gate 175 will be enabled and its output will be transmitted via line 33 to DMA channel 31 (FIG. 1) to inform computer 30 to stop processing information and set up a direct memory access output channel because master computer 11 requires that slave computer 30 send the master computer some information. The information requested by computer 11 is transmitted from computer 30 via DMA channel 31 and line 34 (FIG. 1). The aforementioned information arrives at the inputs to Schmidt AND gate 167 (FIG. 3). Register 164 receives and holds the information that was transmitted by gate 164. Computer 30 (FIG. 1) generates signals that will control the transfer of information from slave computer 30 to master computer 11. The control signals are transmitted via line 35 (FIG. 3) to the inputs of Schmidt AND gate 166. AND gate 166 is enabled and its output will be transmitted to handshake control 160. Handshake control 160 will transmit via line 163 a clock pulse enabling holding register 164. Holding register 164 will then transfer the information stored therein to the input of tristate differential driver 177. The output of driver 177 will be transmitted via lines 41 to the inputs of differential receiver 125 (FIG. 2). The output of receiver 125 enables OR gate 128 which, in turn, transmits the information to the inputs to AND gate 130. The two inputs of AND gate 130 are tied together so that AND gate 130 will act as a line driver. AND gate 130 is enabled and its output is transmitted to computer 11 (FIG. 1) via line 15, whereby a data word is transferred from slave computer 30 to computer 11.

Buffer unit 25 and the computer linkage unit 40, together with other computer linkage units that may be added thereto, operate as an inter-computer communication link that synchronizes communications between similar or dissimilar computers. It provides the necessary electronics to perform data transfer between a master computer and a plurality of slave computers through direct memory access channels. The foregoing system is readily adaptable to existing systems since no functional interfacing problems would exist and no repeater stations or special termination of cables would be required. This would be true even if the master computer and slave computers were far apart since the long transmission distances would ordinarily create a noisy environment and additional interfacing problems.

The above specification describes a new and improved expandable inter-computer communication system which may be used to communicate between a master computer and a plurality of slave computers. It is realized that the above description may indicate to those skilled in the art additional ways in which the principles of this invention may be used without departing from its spirit. It is, therefore, intended that this invention be limited only by the scope of the appended claims.

What is claimed is:

1. A expandable asynchronous parallel intercomputer communication system that provides a two-way communication signal channel between a master computer and a plurality of slave computers, and between said master computer and a plurality of peripheral units which are electrically and functionally compatible with said master computer, said master computer being separated from said plurality of slave computers and said plurality of peripheral units by varying transmission distances, said system comprising:

a. a buffer unit having at least three bidirectional channels so interconnected that signals received by said buffer unit on said first channel are provided to said second and third channels as described in this claim, and signals received by said buffer unit on said second and third channels are provided to said first channel as described in this claim, the first buffer unit bidirectional channel being electrically compatible with and coupled to said master computer and the second buffer unit bidirectional channel being coupled to at least one of said peripheral units, said second buffer unit bidirectional channel transmits electrical signals which are electrically and functionally identical to the signals that are transmitted on said first bidirectional channel so that the presence of said buffer unit does not affect the communications between said master computer and said plurality of peripheral units; the third buffer unit bidirectional channel comprising a bidirectional differential channel which transmits signals that have been electrically altered by said buffer unit without functionally altering the meaning of said signals so that electrical characteristics of said signals are maintained over long transmission distances; and b. a first computer linkage unit for providing functional and electrical interface functions between said first slave computer and said buffer unit, said first computer linkage unit being coupled to said buffer unit at said third buffer unit bidirectional differential channel and coupled to said first slave computer so that said first computer linkage unit may maintain electrical and functional compatibility with said buffer unit and said first slave computer; whereby said first slave computer, and said first computer linkage unit may be added to an existing computer communication system without modifying the existing system.

2. The system claimed in claim 1 further including a second computer linkage unit coupled to said third buffer unit bidirectional channel and a second slave computer.

3. The system claimed in claim 1 wherein:
said first computer linkage unit includes a first bidirectional channel coupled to said third buffer unit bidirectional differential channel; and
said system further includes a first plurality of computer linkage units each including a computer linkage bidirectional channel wherein the bidirectional channel of one of said first plurality of computer linkage units is coupled to the first bidirectional channel of said first computer linkage unit, and the bidirectional channel of each of the remainder of said first plurality of computer linkage units is coupled to the bidirectional channel of the preceding one of said first plurality of computer linkage units, each of said first plurality of computer linkage units being coupled to a different slave computer.

4. The system claimed in claim 1 wherein said buffer unit comprises:
 a. a first receiving means coupled to said master computer for receiving and outputting address, data and control signals from said master computer;
 b. a first driving means coupled to the output of said receiving means for transmitting the address, data and control signals to at least one of said peripheral units;
 c. a first differential driver that accurately transmits control signals whose input is coupled to said driving means and whose output is coupled to the input of said computer linkage unit;
 d. a second differential driver that accurately transmits data signals whose input is coupled to said driving means and whose output is coupled to the input of said computer linkage unit;
 e. a third differential driver that accurately transmits address signals whose input is coupled to said driving means and whose output is coupled to the input of said computer linkage unit;
 f. a second receiving means coupled to the output of at least one of said peripheral units for receiving control and data information from said peripheral unit;
 g. a third receiving means whose inputs are coupled to the output of said first computer linkage unit, said third receiving means receiving control and data information from said slave computer;
 h. ORing means coupled to the outputs of said second and third receiving means for placing the control information on said master computer input/output control line and the data on said master computer input data line;
 i. a second driving means whose input is connected to said master computer input data line control line and whose output is connected to one of the inputs of said master computers; and
 j. a third driving means whose input is connected to said master computer input/output control line and whose output is connected to one of the inputs of said master computer.

5. The system claimed in claim 4 wherein said first receiving means is a first plurality of Schmidt AND gates.

6. The system claimed in claim 4 wherein said first driving means are first, second and third AND gates.

7. The system claimed in claim 4 wherein said second receiving means is a second plurality of Schmidt AND gates.

8. The system claimed in claim 4 wherein said third receiving means is a plurality of differential receivers.

9. The system claimed in claim 4 wherein said second driving means is a plurality of AND gates.

10. The system claimed in claim 1 wherein said first computer linkage unit comprises:
 a. a fourth plurality of differential receivers whose inputs are coupled to the output of said buffer unit;
 b. a first holding register whose input is coupled to the output of one of said fourth plurality of differential receivers, said first holding register storing the data word generated by said master computer;
 c. an address decoder whose input is coupled to the output of one of said fourth plurality of differential receivers, said address decoder receiving and decoding the address generated by said master computer if the address stored in said address decoder is the same address as the address generated by said master computer, said address decoder generating an enable signal;
 d. a plurality of fourth receiving means whose inputs are coupled to the output of said slave computer, said plurality of fourth receiving means receiving data and control information from said slave computer;
 e. a second holding register whose input is coupled to the output of one of said fourth plurality of receiving means, said second holding register storing the information generated by said slave computer;
 f. a function decoder whose inputs are coupled to the output of said address decoder, and the output of one of said fourth plurality of differential receivers receiving control information from said master computer; said function decoder outputting a signal if it receives an enable signal from said address decoder, the signal outputted by said function decoder being the decoded control signal that was transmitted on one of said fourth plurality of differential receivers, the decoded control signal informing said slave computer to read, write or interrupt its current processing of information by generating read, write or interrupt signals;
 g. a handshake control whose inputs are coupled to the read, write and interrupt signals generated by said decoder; said handshake control generating a clock pulse to said first holding register if said function decoder transmits a write signal thus causing said first holding register to output its information; said handshake control generating a clock pulse to said second holding register if said function decoder transmits a read signal, thus causing said second holding register to output its information; said handshake control generating a signal that causes the enabling of an AND that is coupled to said slave computer whereby a control signal is transmitted to said slave computer informing said slave computer what function said master computer wishes it to perform;
 h. a second AND gate that is enabled when said first holding register outputs information, the output of said second AND gate being coupled to the input of said slave computer in order to receive data from said master computer;
 i. a fourth differential driver that is coupled to the output of said handshake and the input of said buffer in order to transmit control information through said buffer; and j. a fifth differential driver that is coupled to the output of said second holding register and the input of said buffer so that data from said slave computer may be transmitted through said buffer.

11. The system claimed in claim 10 further including a first plurality of cables, one end of which is connected to the inputs of said fourth plurality of differential receivers, the other end of said first plurality of cables being connected to the input of an additional computer linkage unit with an additional slave computer attached thereto so that said additional slave computer may receive signals from said master computer and a second plurality of cables, one end of which is connected from the output of said additional slave computer, the other end of which is connected to the input of said buffer unit so that information from said additional slave computer may be transmitted from said additional slave computer to said master computer.

12. The system defined in claim 10 wherein said fourth plurality of receiving means is a third plurality of Schmidt AND gates.

13. The system claimed in claim 1 wherein:
said first computer linkage unit includes a first computer linkage unit bidirectional channel coupled to said third buffer unit directional differential channel; and
said system further includes a first plurality of computer linkage units, each coupled to a different slave computer and each including a computer linkage unit bidirectional channel, said plurality of computer linkage unit bidirectional channels being connected one to the other and to said third buffer unit directional differential channel.

14. Apparatus for providing bidirectional communication between a first computer and a second computer, and between the first computer and a peripheral device, comprising:
first buffer means adapted to be connected between a first computer and a peripheral device for providing first computer signals from the first computer to the peripheral device in a noise reduced condition;
second buffer means adapted to be connected between the first computer and the peripheral device for providing received signals to the first computer in a noise reduced condition;
third buffer means operatively connected to said first buffer means to receive noise-reduced first computer signals therefrom for electrically altering at its input and de-altering at its output noise-reduced computer signals so that the electrical and functional characteristics of such signals can be maintained over substantial transmission distances;
first linkage means operatively connected to said third buffer means to receive noise-reduced first computer signals therefrom and adapted to be connected to a second computer, for interfacing signals to and from the second computer; and
fourth buffer means operatively connected to said first linkage means to receive second computer signals therefrom, and operatively connected to said second buffer means, for electrically altering at its input and de-altering at its output received second computer signals so that the electrical and functional characteristics of such signals can be maintained over substantial transmission distances and are provided to said second buffer means, wherein said second buffer means provides signals received from the peripheral device and from said first linkage means to said first computer in a noise reduced condition.

15. Apparatus as recited in claim 14 wherein:
said third buffer means comprises a first differential channel; and
said fourth buffer means comprises a second differential channel.

16. Apparatus as recited in claim 14 wherein said first linkage means comprises:
first transfer means operatively connected to said third buffer means and adapted to be operatively connected to the second computer for providing noise reduced first computer signals from said third buffer means to the second computer upon receipt of a first latching signal;
second transfer means operatively connected to said fourth buffer means and adapted to be operatively connected to said second computer for providing any received second computer signals from the second computer to said fourth buffer means upon receipt of a second latching signal; and
controller means operatively connected to said third buffer means to receive noise-reduced first computer signals therefrom, connected to said fourth buffer means to provide a handshake signal thereto, and adapted to provide a first control signal to the second computer and receive a second control signal from the second computer, for producing said handshake signal, said first control signal, and said first latching signal or said second latching signal in response to the received noise-reduced first computer signal and the received second control signal.

17. Apparatus as recited in claim 16 wherein said controller means comprises:
first signal processing means operatively connected to said third buffer means to receive an address signal as a noise-reduced first computer signal therefrom and responsive to a predetermined address signal for producing an enabling signal in response to the predetermined address signal;
second signal processing means operatively connected to said third buffer means to receive a function signal as a noise-reduced first computer signal therefrom, and to said first signal processing means to receive the enabling signal therefrom, for producing a command signal in response to the function signal upon receiving said enabling signal; and
control means operatively connected to said second signal processing means to receive the command signal therefrom, operatively connected to said first transfer means, operatively connected to said second transfer means, operatively connected to said fourth buffer means, and adapted to be connected to the second computer, for producing said handshake signal, said first control signal, and said first latching signal or said second latching signal in response to the received command signal and the received second control signal.

18. Apparatus as recited in claim 14, further comprising:
a plurality of linkage means operatively connected to said third buffer means to receive noise-reduced first computer signals therefrom, operatively connected to said fourth buffer means and adapted to each be connected to a corresponding one of a like plurality of computers, for interfacing signals to and from each of the like plurality of computers.

19. Apparatus as recited in claim 18 wherein each of said plurality of linkage means comprises:
  first transfer means operatively connected to said third buffer means and adapted to be operatively connected to the corresponding one of the like plurality of computers for providing noise-reduced first computer signals from said third buffer means to the one computer upon receipt of a first latching signal;
  second transfer means operatively connected to said fourth buffer means and adapted to be operatively connected to the corresponding one of the like plurality of computers for providing any received computer signals from the corresponding one of the like plurality of computers to said fourth buffer means upon receipt of a second latching signal;
  first signal processing means operatively connected to said third buffer means to receive an address signal as a noise-reduced first computer signal therefrom and responsive to a predetermined address signal for producing an enabling signal in response to the predetermined address signal;
  second signal processing means operatively connected to said third buffer means to receive a function signal as a noise-reduced first computer signal therefrom, and operatively connected to said first signal processing means to receive the enabling signal therefrom, for producing a command signal in response to the function signal upon receiving said enabling signal; and
  controller means operatively connected to said second signal processing means to receive the command signal therefrom, operatively connected to said first transfer means to provide the first latching signal thereto, operatively connected to said second transfer means to provide the second latching signal thereto, operatively connected to said fourth buffer means to provide a handshake signal thereto, and adapted to provide a first control signal to the corresponding one of the like plurality of computers and receive a second control signal from the corresponding one of the like plurality of computers, for producing said handshake signal, said first control signal, and said first latching signal or said second latching signal in response to the received command signal and the received second control signal.

20. Apparatus for interfacing a first computer and a second computer, comprising:
  first transfer means, adapted to be operatively connected to the first computer, and to the second computer for providing first computer signals from the first computer to the second computer upon receipt of a first latching signal;
  second transfer means, adapted to be operatively connected to the first computer and to the second computer, for providing any received second computer signals from the second computer to the first computer upon receipt of a second latching signal;
  first signal processing means, adapted to be operatively connected to the first computer to receive an address signal therefrom and responsive to a predetermined address signal, for producing an enabling signal in response to the predetermined address signal;
  second signal processing means adapted to be operatively connected to the first computer to receive a function signal therefrom, and operatively connected to said first signal processing means to receive the enabling signal therefrom, for producing a command signal in response to the function signal upon receiving said enabling signal; and
  controller means operatively connected to said second signal processing means to receive the command signal therefrom, operatively connected to said first transfer means to provide the first latching signal thereto, operatively connected to said second transfer means to provide the second latching signal thereto, adapted to provide a handshake signal to the first computer, adapted to provide a first control signal to the second computer, and adapted to receive a second control signal from the second computer, for producing said handshake signal, said first control signal, and said first latching signal or said second latching signal in response to the received command signal and the received second control signal.

* * * * *